Oct. 22, 1940.    R. D. YANKEE    2,219,156
WHEEL STRUCTURE
Filed Aug. 12, 1939
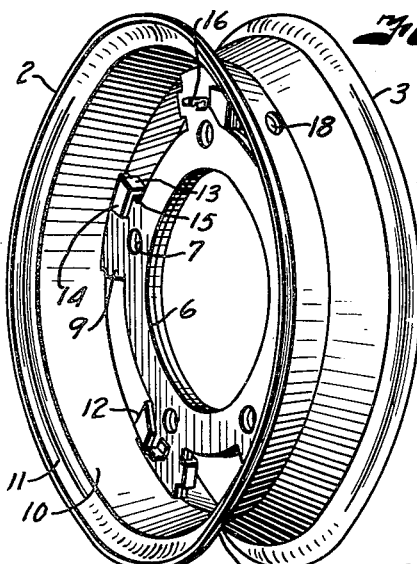
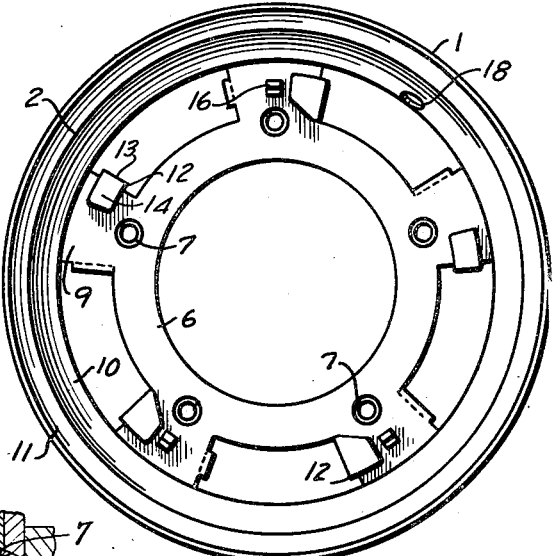
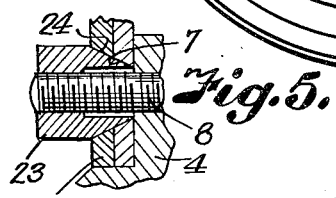
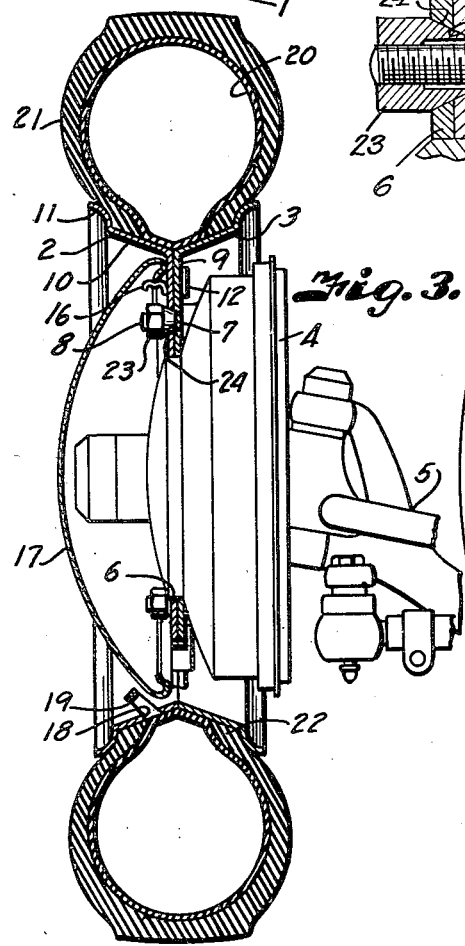
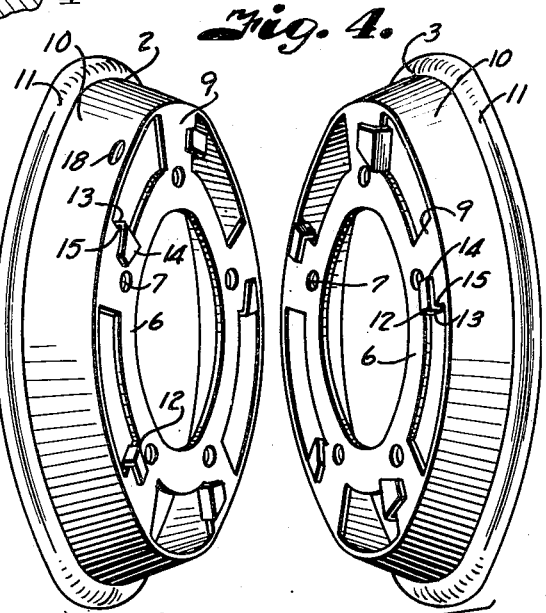
INVENTOR
Ralph D. Yankee
BY  Arthur C. Brown
ATTORNEY Patented Oct. 22, 1940

2,219,156

UNITED STATES PATENT OFFICE 2,219,156

WHEEL STRUCTURE

Ralph D. Yankee, Kansas City, Mo.

Application August 12, 1939, Serial No. 289,819

6 Claims. (Cl. 301—63)

This invention relates to wheel structures and more particularly to wheel structures for automotive vehicles, the principal object of the present invention being to provide a light, strong, efficient and easily fabricated wheel structure.

Other important objects of the present invention are to provide an interlocking, split wheel structure, consisting of substantially duplicate halves; to provide a wheel structure which facilitates the application and removal of tires relative thereto, and which facilitates application to and removal of the wheel structure from a support on the vehicle to be supported; to provide a wheel structure which requires less material and fewer manufacturing operations, while retaining adequate strength, than wheel structures heretofore available; to provide an economical wheel structure; and to provide improved elements in a wheel structure of this character, together with improved arrangements of such elements.

In accomplishing these and other objects of the present invention, I have provided improved details of structure, the preferred forms of which are illustrated in the accompanying drawing, wherein:

Fig. 1 is a perspective view of a wheel structure embodying the preferred form of my invention.

Fig. 2 is a side elevational view of the wheel structure illustrated in Fig. 1.

Fig. 3 is a vertical section through a wheel structure embodying the features of the present invention, and showing a tire, in vertical cross-section, in operative position on the wheel structure, the wheel structure and tire being illustrated in a suitable application to a conventional axle and brake drum housing unit.

Fig. 4 is a perspective view of my improved wheel structure, the substantially duplicate halves thereof being shown in disassembled, spaced relation.

Fig. 5 is an enlarged sectional view through a nut and the wheel sections showing a tapered seat for the wheel sections.

Referring more in detail to the drawing:

1, Fig. 1, designates a wheel structure embodying the features of the present invention in which a pair of substantially duplicate, interlocking, split-wheel halves 2 and 3, Fig. 4, are interengageable, as shown in Fig. 3, and adapted for support on a conventional brake drum housing 4, which in turn is rotatably mounted upon a suitable axle unit 5.

Each half 2 and 3 of the wheel structure preferably includes an annular base ring 6 perforated, as at 7, with apertures of sufficient size and number to receive the usual studs 8 extending from the housing 4 by which to mount the wheel structure in operative position on the housing. Radial webs 9 project from the outer periphery of the ring 6 at spaced points thereon adjacent the apertures 7 and terminate in an upwardly and outwardly inclined annular flange 10, which is provided with a tire retaining rim portion 11.

The webs 9 are preferably each provided with ears 12 substantially in the form of angle clips, one flange 13 of each of the clips being secured to its corresponding web as by forming an integral part thereof and being shaped by a suitable stamping operation when the wheel structure is fabricated. The other flange 14 of the clips or ears may then be turned laterally in a suitable pressing operation in such a manner that all the ears extend in the same direction and are spaced, as at 15, from the webs in overlapping relation thereto. The ears are, further, preferably arranged to substantially abut the outer periphery of the ring 6 and are of a width less than the distance between the outer periphery of the ring 6 and the inner periphery of the flange 10 to the end that when the wheel halves are interlocked, sufficient space remains on the exterior of the wheel to accommodate clips 16, Fig. 3, on which a suitably decorative hub cap 17 may be mounted.

As a matter of practice, a suitable aperture 18 may be provided in one of the wheel structure halves for passage of the usual valve 19 adapted for inflating or deflating an inner tube 20 in a tire casing 21.

In assembling and using a wheel structure, constructed as described, one of the wheel structure halves, 3 for example, is laid flat on a suitable support. A tire casing, with inner tube arranged therein, is then mounted on the inclined flange 10 of the wheel half 3. The wheel half 2 is then applied to the wheel half 3, with the rings 6 in frictional engagement and with the aperture 18 in the flange of the wheel half 2 aligned with the air valve of the tire inner tube. The wheel halves 2 and 3 are then slid rotatively relative to each other in opposite directions in such a manner that the now oppositely arranged ears interengage to lock the wheel halves together. Air may then be applied to the inner tube of the tire to impart a tight fit of the tire on the wheel structure, and in such a manner that the flanges 22 of the tire casing rest on the inclined faces of the flanges 10 between the rim portions 11 and the inner tube is supported on the joined inner edges of the inclined flanges and portions thereof adjacent thereto.

The wheel structure, with tire in place, may then be applied to the brake drum housing by passing the apertures in the rings 6 of the wheel structure over the studs 8 on the housing. Nuts 23 having long tapers 24 seating in similarly tapered counter-sinkings of the apertures 7 are then applied to the studs in such a manner that the edges of the rings 6 of the wheel structure, bounding the apertures 7, rest on the nuts and the wheel structure is thus supported thereon to avoid the possibility of stripping threads on the studs. A hub cap may then be applied to the clips therefor on the wheel structure to cover the outer end of the axle, the brake drum housing, nuts and the greater part of the assembled wheel structure.

A reversal of the operation just described may be employed for removing a tire from the wheel structure and automotive vehicle to which the wheel structure and tire have been applied.

It is apparent therefore that I have provided by this invention a convenient, economical, light, durable and efficient wheel structure, which is easily manufactured, assembled and disassembled and that tire changing has been materially simplified thereby and to such an extent that inexperienced persons of slight build may quickly change a tire when the occasion so demands. It is further apparent that less material is necessary in the manufacture of wheel structures of this nature due to the fact that a double thickness of light gauge metal may be employed, with greater strength provided, than a single thickness of heavy gauge material. Stamping operations in manufacture are reduced by the provision of my substantially duplicate split wheel sections. Studs and connecting lugs are reduced to a minimum, and the tires mounted on the wheel structure benefit due to the fact that because of the inclined flanges, less bending of the casing results and consequently strains are taken off the casing which makes the tire last longer.

What I claim and desire to secure by Letters Patent is:

1. In a wheel structure, a pair of substantially duplicate half wheel sections, each half section including a rim portion, a flange projecting from the rim portion for supporting a portion of a tire, a ring arranged concentrically within said flange, spaced webs connecting the ring with the flange, and ears on the webs of each section engageable with the webs on the other section and fitting around said last named webs respectively for connecting said wheel sections together, said ears substantially abutting said ring on one side thereof for centering said wheel sections relative to each other.

2. In a wheel structure, a pair of substantially duplicate half wheel sections, each half section including a rim for supporting a portion of a tire, a ring spaced from and arranged concentrically within said rim, means forming part of said rim and ring connecting the ring with the rim, and means on said connecting means respectively extending around the edge of portions of the other section in overlapping relation thereto for joining said pair of sections together.

3. In a wheel structure, a pair of substantially duplicate half wheel sections, each half section including a flange for supporting a portion of a tire, a ring arranged concentrically within said flange, spaced webs connecting the ring with the flange, and ears on the webs of each section engageable with the webs on the other section and fitting around said last named webs respectively for connecting said wheel sections together.

4. In a wheel structure, a pair of substantially duplicate half wheel sections, each half section including a flange for supporting a portion of a tire, means projecting inwardly from said flange for mounting the wheel structure on a vehicle, and interengageable cooperative means on said inwardly projecting means of each section respectively extending around the edge of the corresponding portion of the other section and being responsive to pressures in a tire mounted on said structure for holding said wheel sections in position relative to each other prior to mounting the structure on said vehicle.

5. In combination with a rotatable support having at least one threaded stud projecting therefrom, a wheel structure comprising substantially duplicate half wheel sections, each half section having a tapered aperture alignable when the sections are connected to form a continuous tapered aperture through both sections for mounting the structure on said support stud, and a threaded member engageable with said stud and having an exterior taper substantially corresponding to the aperture taper of said sections for immediately supporting both sections of the structure, whereby the threads on the stud and member may be maintained in effective condition.

6. A wheel structure of the character described including a pair of substantially duplicate half wheel sections, each half section including a member mutually cooperative with a similar member on the other section to support a tire, means to attach and support the wheel sections in operative position on a device the wheel structure is to support, spaced means on each section circumferentially arranged about the attaching and supporting means and extending to the tire supporting member of the respective sections to interconnect the tire supporting members with the structure supporting means, and means on at least one of the circumferentially arranged means of each section for fitting around at least one of the circumferentially arranged means on the other section, said means being adapted to connect said sections together and hold the sections in connected relation.

RALPH D. YANKEE.